US012631044B2

(12) United States Patent
Perrin et al.

(10) Patent No.: US 12,631,044 B2
(45) Date of Patent: May 19, 2026

(54) HANDLE ARRANGEMENT

(71) Applicant: U-shin Italia S.p.A, Pianezza (IT)

(72) Inventors: Christophe Perrin, Nevers (FR); Thomas Lanno, Nevers (FR)

(73) Assignee: U-shin Italia S.p.A, Pianezza (IT)

( * ) Notice: Subject to any disclaimer, the term of this patent is extended or adjusted under 35 U.S.C. 154(b) by 265 days.

(21) Appl. No.: 18/343,368

(22) Filed: Jun. 28, 2023

(65) Prior Publication Data

US 2024/0003164 A1 Jan. 4, 2024

(30) Foreign Application Priority Data

Jun. 29, 2022 (EP) .................................... 22181978

(51) Int. Cl.
*E05B 15/00* (2006.01)
*E05B 81/90* (2014.01)
*E05B 85/18* (2014.01)

(52) U.S. Cl.
CPC .......... *E05B 15/0093* (2013.01); *E05B 81/90* (2013.01); *E05B 85/18* (2013.01)

(58) Field of Classification Search
CPC . E05B 85/00–28; E05B 81/90; E05B 15/0093
See application file for complete search history.

(56) References Cited

U.S. PATENT DOCUMENTS

| | | | | |
|---|---|---|---|---|
| 2010/0088855 A1* | 4/2010 | Ruse | E05B 77/06 16/412 | |
| 2017/0292297 A1 | 10/2017 | Bartels et al. | | |
| 2017/0370131 A1* | 12/2017 | Ono | E05B 81/90 | |
| 2019/0055761 A1* | 2/2019 | Yoshino | E05B 85/16 | |
| 2020/0332575 A1* | 10/2020 | Christensen | E05B 85/18 | |
| 2022/0034130 A1* | 2/2022 | Frattini | E05B 81/76 | |

FOREIGN PATENT DOCUMENTS

| | | | | |
|---|---|---|---|---|
| DE | 10 2017 001 769 A1 | 8/2018 | | |
| DE | 102020203891 A1 * | 8/2021 | E05B 77/06 | |
| WO | WO 2016/041996 A1 | 3/2016 | | |
| WO | WO 2019/120728 A1 | 6/2019 | | |

OTHER PUBLICATIONS

Espacenet, machine translation of DE-102020203891-A1, generated May 10, 2025. (Year: 2025).*
Extended European Search Report & Written Opinion issued Jan. 2, 2023 in European Application 22181978.2 filed on Jun. 29, 2022, 7 pages.

* cited by examiner

*Primary Examiner* — Kristina R Fulton
*Assistant Examiner* — Emily G. Brown
(74) *Attorney, Agent, or Firm* — Oblon, McClelland, Maier & Neustadt, L.L.P.

(57) ABSTRACT

The invention relates to a handle arrangement comprising a handle, a deploying system of the handle pivotally coupled with the handle and comprising a toggle member pivoting about a primary axis A1 and comprising a central body with two opposite ends to which extend one arm respectively, each arm being connected to one extremity of the handle, and a counterweight pivoting about a secondary axis A2 parallel to the primary axis A1, and a declutching system cooperating with the deploying system and having a clutch position and a declutch position, wherein the declutching system cooperates with the central body of the deploying system, and wherein the declutching system, the counterweight and the toggle member pivot about respective axles.

11 Claims, 7 Drawing Sheets

Fig. 3
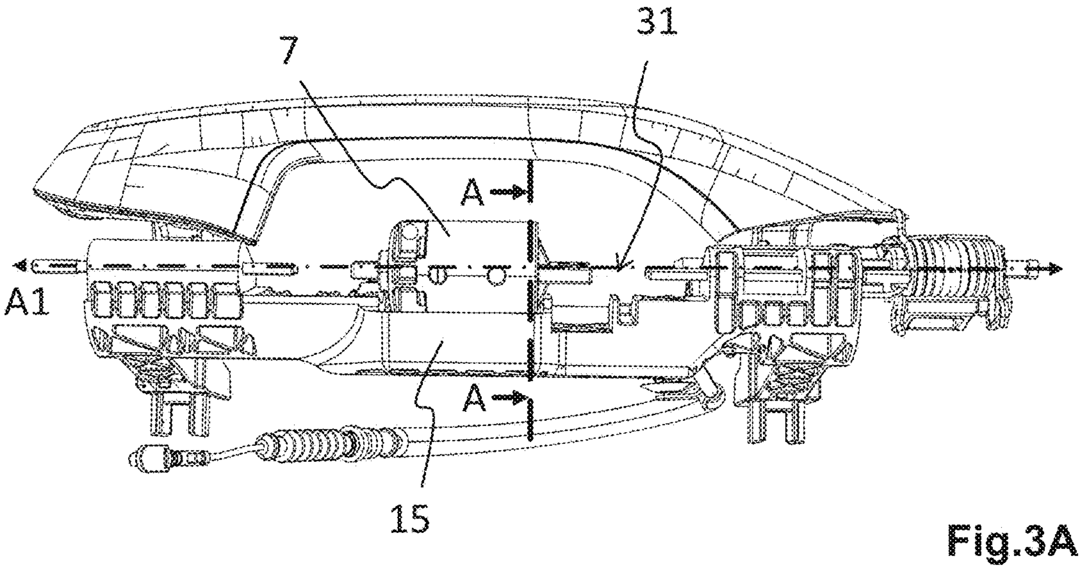
Fig.3A
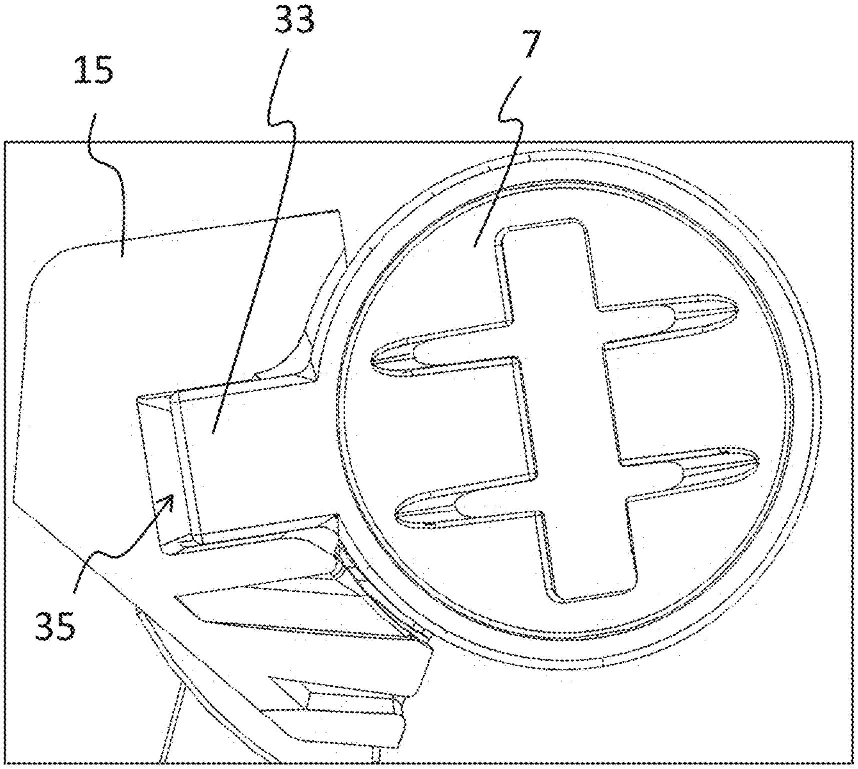
Fig.3B

Fig. 4
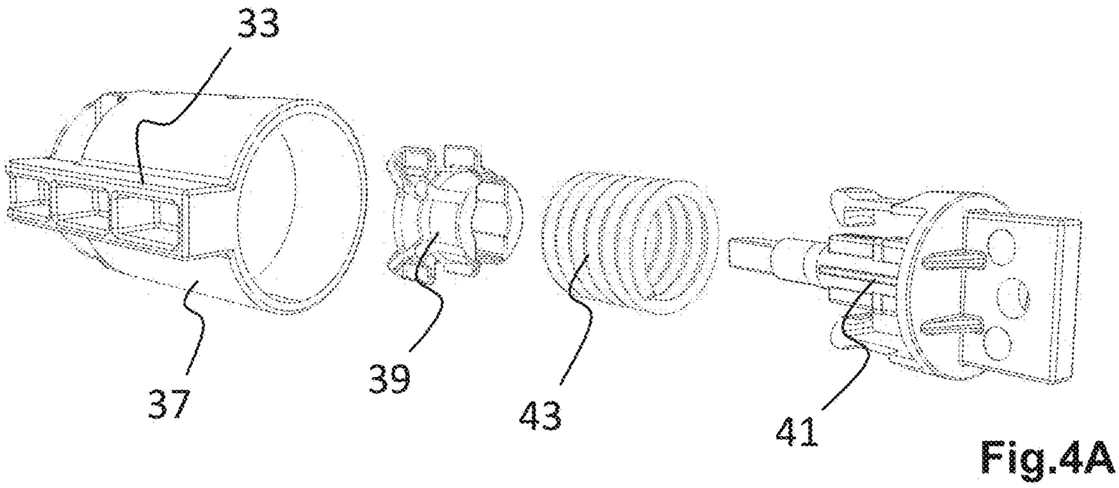
Fig.4A
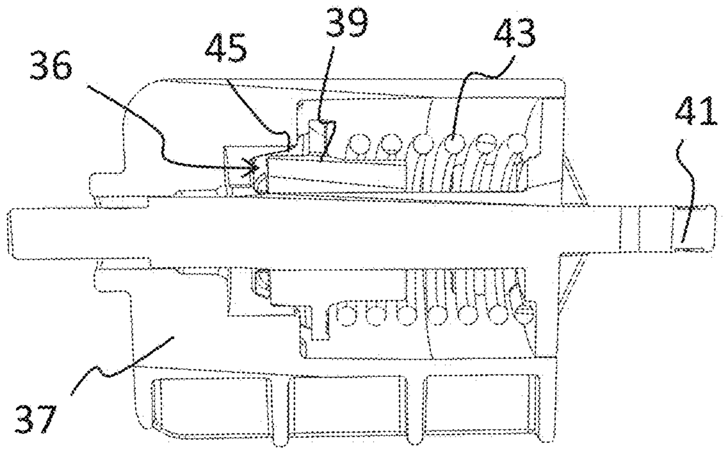
FIG.4B
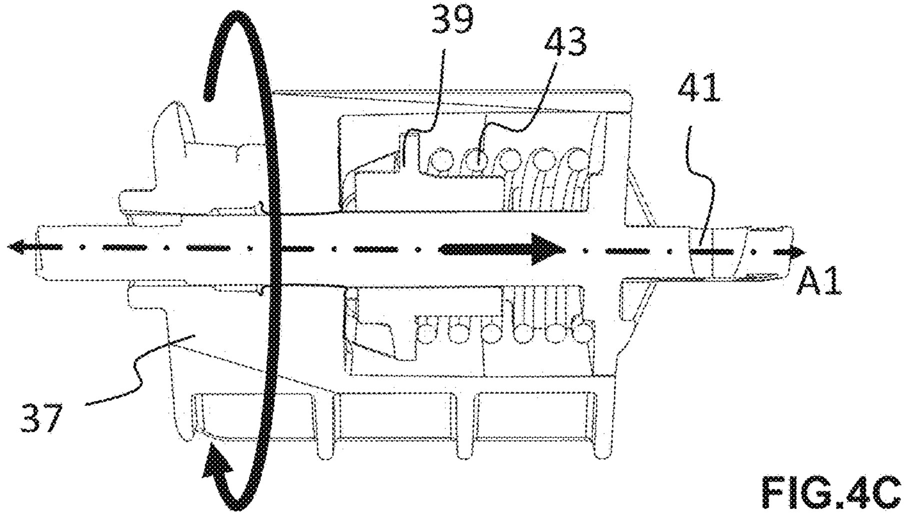
FIG.4C

Fig. 5
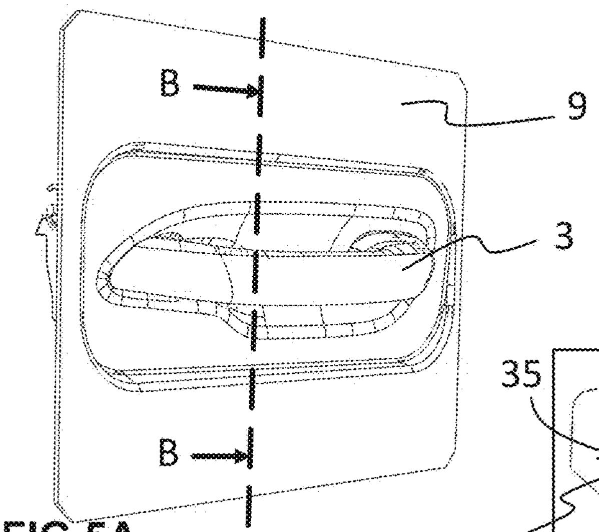
FIG.5A
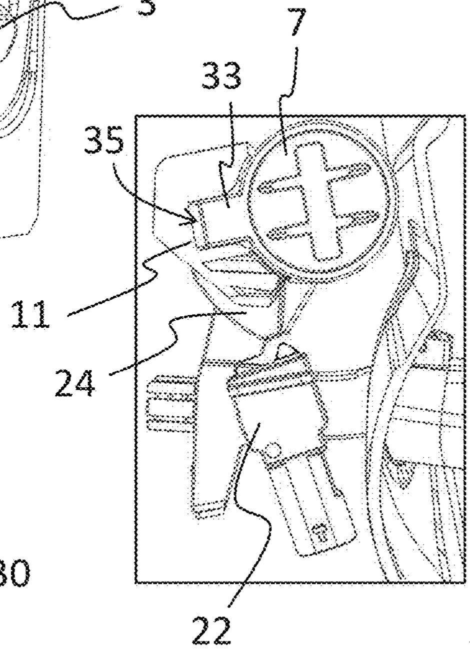
FIG.5C
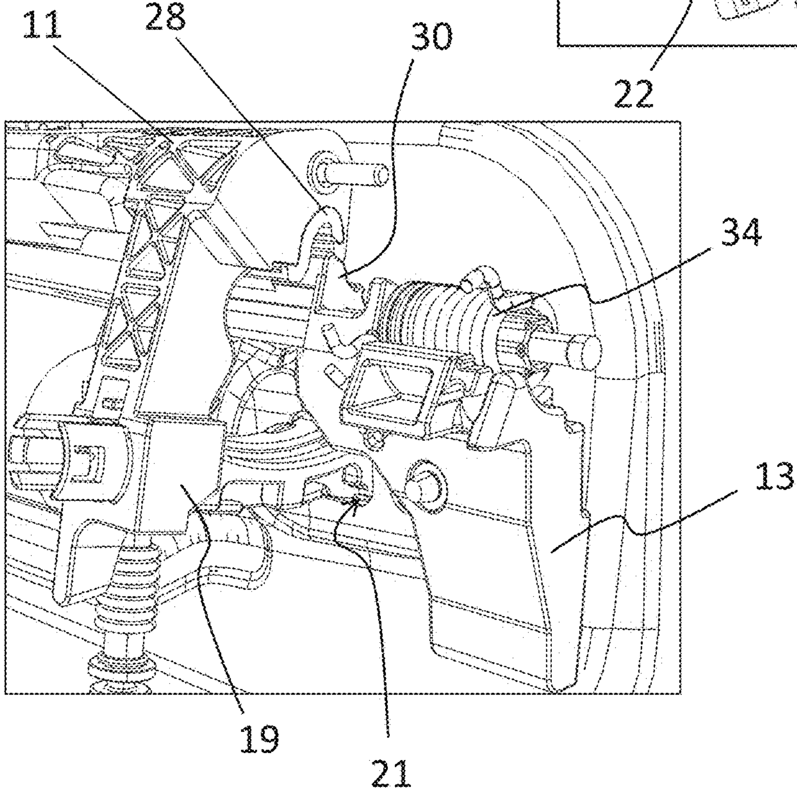
FIG.5B

Fig. 6
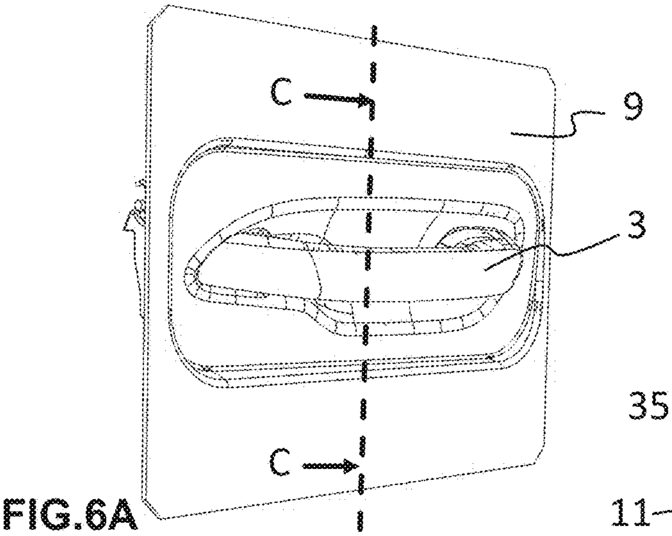
FIG.6A
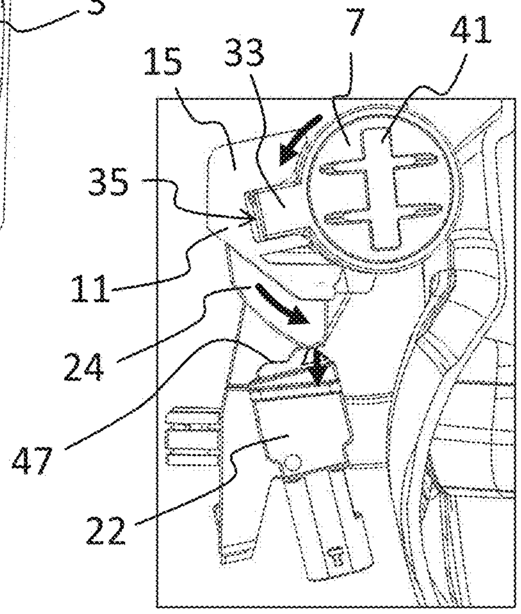
FIG.6C
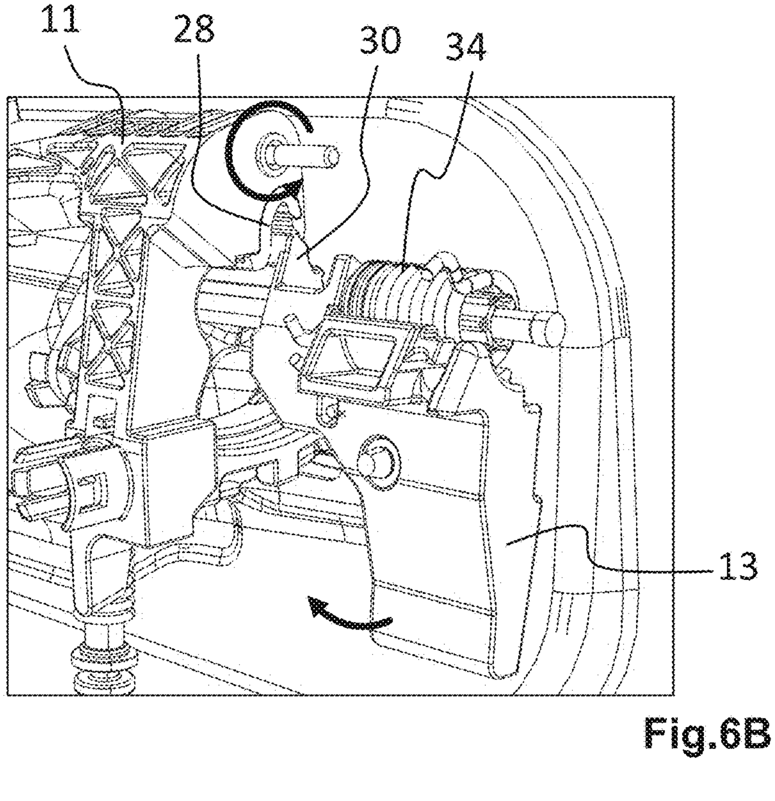
Fig.6B

Fig. 7
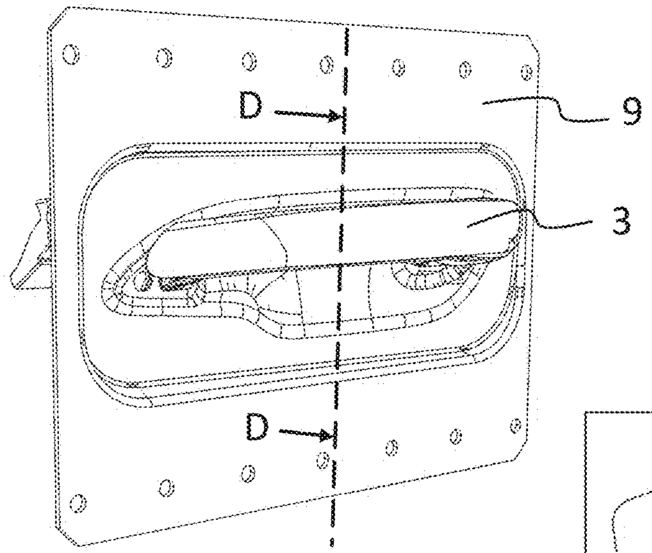
FIG.7A
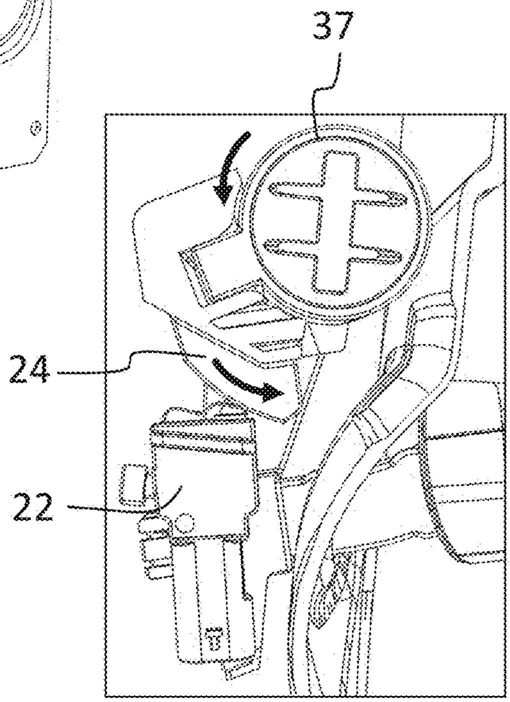
FIG.7C
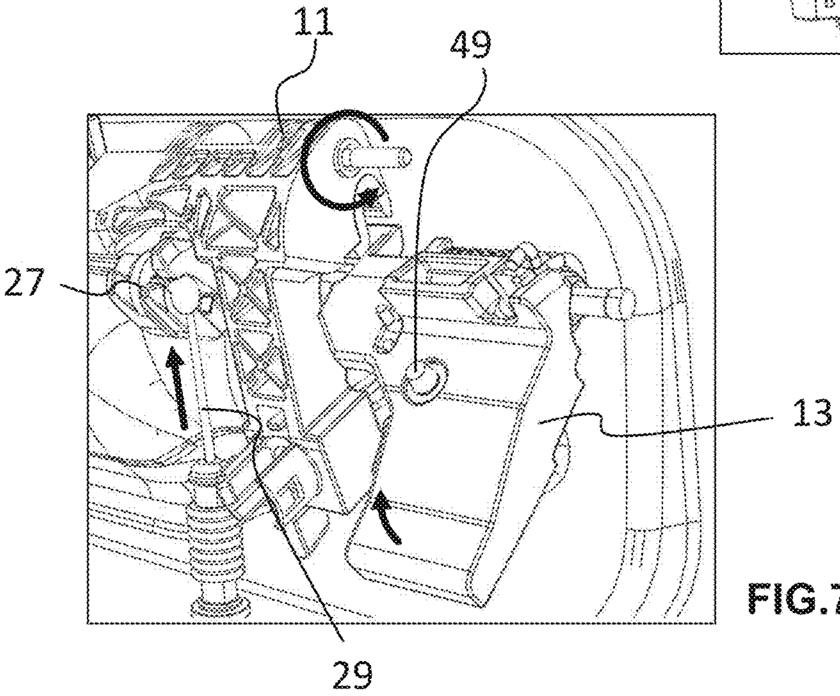
FIG.7B

HANDLE ARRANGEMENT

The invention relates to a handle arrangement of a motor vehicle, in particular in the case of automated door latches that are controlled via electric means.

Automated door latches selectively lock or release vehicle door panels in an automated fashion. By automated door latches are herein designated door latches provided with a manually operable handle element and a rotatably mounted transmission lever which is connected to the handle element and can be rotated by actuating the handle element to such an extent that it activates a switch for opening the door latch.

Once the door panel is released, the user or an electric panel actuator swings or slides the panel to grant physical access to the vehicle.

However, in such an electrical system, problems arise when the doors cannot be electrically opened anymore, particularly in case of a crash accident or because of an empty vehicle battery.

It is known to implement a declutching system for a handle arrangement that blocks a rotatably transmission lever when the handle is actuated beneath a predetermined force threshold. Hence, when the user actuates the handle element below the predetermined force threshold, he actuates the electrical opening system of the handle arrangement. When the user actuates the handle element above the predetermined force threshold, he declutches the mechanical opening system of the handle arrangement. This system is rotatably mounted in the handle arrangement and comprises a counterweight that pivots about the axle of the declutching system.

However, this declutching system is specifically adapted for the handle arrangement of automated door latches and in case of mechanical door latches, it cannot just be removed from the handle arrangement, such that the latter has to be fully redesigned. Moreover, during handle deployment, this declutching system implies high effort transmitted from the counterweight to declutching system through the internal structure of the handle arrangement.

The invention intends to obviate at least partly this lack in the art.

The object of the invention is to provide a handle arrangement with a flexible declutching system that implies few transmitted efforts on the declutching system during handle deployment.

To that end, the invention relates to a handle arrangement comprising

- a handle moveable between a stowed position, an intermediate position in which the handle causes an electrical unlatching of a door and a deployed position in which the handle causes a mechanical unlatching of the door,
- a deploying system of the handle pivotally coupled with the handle and comprising a counterweight being rotatably mounted in the handle arrangement,
- a declutching system being rotatably mounted in the handle arrangement on a primary axis, the declutching system cooperating with the deploying system and having a clutch position, in which it impairs with the deploying system movement to prevent the handle to move from the intermediate position to the deployed position in case a load force beneath a predetermined force threshold is applied on the handle, and a declutch position wherein the declutching system allows the handle to move from the intermediate position to the deployed position in case a load force above a predetermined force threshold is applied on the handle,

- wherein the counterweight pivots about a secondary axis parallel to the primary axis and is configured to trigger the mechanical unlatch of the door when the handle is in the deployed position,
- wherein the deploying system comprises a toggle member comprising a central body with two opposite ends to which extend one arm respectively, each arm being connected to one extremity of the handle and the toggle member being pivotally mounted in the handle arrangement about the primary axis and driving into rotation the counterweight,
- wherein the declutching system cooperates with the central body of the deploying system and both pivot about the primary axis in the same direction, and
- wherein the declutching system, the counterweight and the toggle member pivot about respective axles.

Advantageously in the invention, the declutching system can be removed from the handle arrangement without impairing with the deployment of the handle since the declutching system, the toggle member and the counterweight all pivot about different axles. Consequently, a unique handle arrangement can be implemented both in automated and mechanical door latches. A second advantage arising from the invention is that during handle deployment, low effort is transmitted on the declutching system because on one part the counterweight and the declutching system pivot about different axis, and on another part the declutching system and the toggle member pivot about the same axis. According to the configuration of the handle arrangement of the invention, advantageously, the declutching system and the counterweight, while both cooperating with the toggle member, are independent from each other.

Because they are connected, the toggle member and the handle have the same three positions. Besides, the cooperation between the toggle member and the declutching system is such that it allows the toggle member to move from a stowed position to an intermediate position, corresponding the same positions of the handle, whatever the lead force exerted by the user to move the handle from the stowed position to the intermediate position. Then, in case the said load force is beneath the determined force threshold of the declutching system, the declutching system prevents the toggle member to move from the intermediate position to a deployed position, and consequently prevents the handle to do the same. Such blocking of the handle movement gives a haptic return to the user indicating an electrical unlatch of the door. In case the door does not automatically unlatch, the user has the possibility to pull harder on the handle with a load force higher than the said threshold. Consequently, the declutching system is declutched and does not impair anymore with the deploying system, letting free the handle and the toggle member to move from the intermediate position to the deployed position which will activate the mechanical unlatch of the door via rotation of the counterweight.

Notably, the handle arrangement comprises an electric door unlatch actuator which is activated by the toggle member in the intermediate position.

Especially, wherein the central body of the toggle member extends parallelly to the longitudinal direction of the handle.

In one embodiment of the invention, the central body of the toggle member comprises a cavity in which the declutching system is arranged. Notably, the cavity has a complementary form of at least a part of the declutching system.

In one embodiment of the invention, the toggle member pivots about the primary axis by means of two axles, each one being arranged at each end of the central body or at an upper end of each arm.

In another embodiment of the invention, the declutching system and the central body cooperates by means of a rib and a groove arranged alongside the primary axis. Notably, in the stowed position of the toggle member, the rib and the groove are spaced apart by a gap sized for allowing the toggle member to move from the stowed position to the intermediate position. In the intermediate position, the rib and the groove are put in contact. This contact gives the haptic return to the user indicating the electrical unlatch of the door.

The rib and the groove can be arranged interchangeably on the declutching system and the central body. Notably, the rib is arranged on the declutching member and the groove is arranged on the central body. In particular, the said groove or rib is disposed of in the cavity of the central body.

In another embodiment of the invention, the declutching system is located at an equal distance from each end of the central body of the toggle member. In that position, the activation effort will be well reparteed during handle deployment.

In another embodiment of the invention, the declutching system is arranged on the front side of the handle arrangement relative to the central body of the toggle member. By "front side", it is meant in the invention the side oriented toward the body skin of the vehicle when the handle arrangement is implemented therein. In contrast, "backside" refers to the side oriented toward the inside of the vehicle.

In another embodiment of the invention, the declutching system comprises a housing arranged on the axle of the declutching system and pivoting about the primary axis. Notably, the rib or the groove is arranged on the said housing.

In particular, in the clutch position, when a torque of magnitude applied on the housing is beneath the determined force threshold, the housing is blocked into rotation around the axle, and in the declutch position, when a torque of magnitude applied on the housing is above the determined force threshold, the housing is free to rotate around the axle.

In particular, the declutching system further comprises a declutching member and a reversibly deformable member arranged in the housing and on the axle, the declutching member being configured to translate along the axle, the reversibly deformable member maintaining the declutching member against at least one internal cam of the housing, wherein in the clutch position the declutching member blocks the housing in rotation around the axle by cooperating with the least one cam of the housing and wherein in the declutch position the declutching member is pushed against reversibly deformable member enabling the housing to rotate around the axle.

Alternatively, the declutching system further comprises a declutching member arranged in the housing and on the axle, the declutching member comprising a body to which extends at least one reversibly deformable leg, wherein in the clutched position the at least one reversibly deformable leg cooperates with at least one internal cam of the housing and blocks into rotation the housing around the axle and wherein in the declutched position the at least one reversibly deformable leg is deformed in the direction of the body and thereof enabling the rotational displacement of the housing around the axle.

In another alternative, the declutching system further comprises a declutching member arranged in the housing and on the axle, the declutching member comprising a pivotable arranged lever and a reversibly deformable member, the lever being provided with a head at its free end cooperating with the reversibly deformable member, wherein in the clutch position the head of the lever cooperates with an internal cam of the housing so as to prevent the housing to rotate about the axle and is maintained in position by the reversibly deformable member and wherein in the declutch position the head of the lever compresses the reversibly deformable member enabling the rotational displacement of the housing around the axle.

For all these alternatives, especially, in the clutch position, the at least one cam of the housing and the declutching member are spaced apart by a gap sized for allowing the housing to move about the primary axis and the toggle member to move from the stowed position to the intermediate position. In the intermediate position, the at least one cam of the housing and the declutching member are put in contact. This contact gives the haptic return to the user indicating the electrical unlatch of the door.

In an embodiment of the invention, the counterweight has a rest position, an intermediate position and an unlatch position in which it mechanically unlatches the door. To that end, the counterweight may comprise a cable puller for unlatching the door latch. When pivoting to the unlatch position, the cable puller pulls on a cable and unlatch the door.

In particular, the counterweight cooperates with one end of the central body of the toggle member. The counterweight may comprise two joined parts successively disposed along the secondary axis, wherein a first part is disposed between the two arms of the toggle member and a second part disposed outside the toggle member. Notably, the cable puller can be arranged on the first part or on the second part.

In an embodiment of the invention, the toggle member and the counterweight pivot in a reverse direction about their respective axis. Similarly, the declutching system and the counterweight pivot in a reverse manner.

In an embodiment of the counterweight comprises a core member to which extend at least one weight downwardly. By "downwardly", it is meant in the invention in the direction of the ground when the handle arrangement is implemented in the vehicle. By contrast, "upwardly" refers to the opposite direction, i.e., the sky, when the handle arrangement is implemented in the vehicle.

In particular, the counterweight comprises two weights, each being arranged on one of opposite sides of one arm of the toggle member, such that when the handle moves from the intermediate position to the deployed position, the said arm moves between the said two weights. Notably, each weight is arranged respectively on the first and second part of the counterweight. Especially, one of the weights is heavier and is arranged on the second part.

The invention will be better understood in view of the following description, referring to the annexed figures in which:

FIG. 2 represents two views (A and B) of a handle arrangement of the invention.

FIG. 3 represents two upper views (A and B) of the handle arrangement of FIG. 1. FIG. 3B is a sectional view of FIG. 3A according to the cutting plan AA represented in FIG. 3A.

Figure 1:
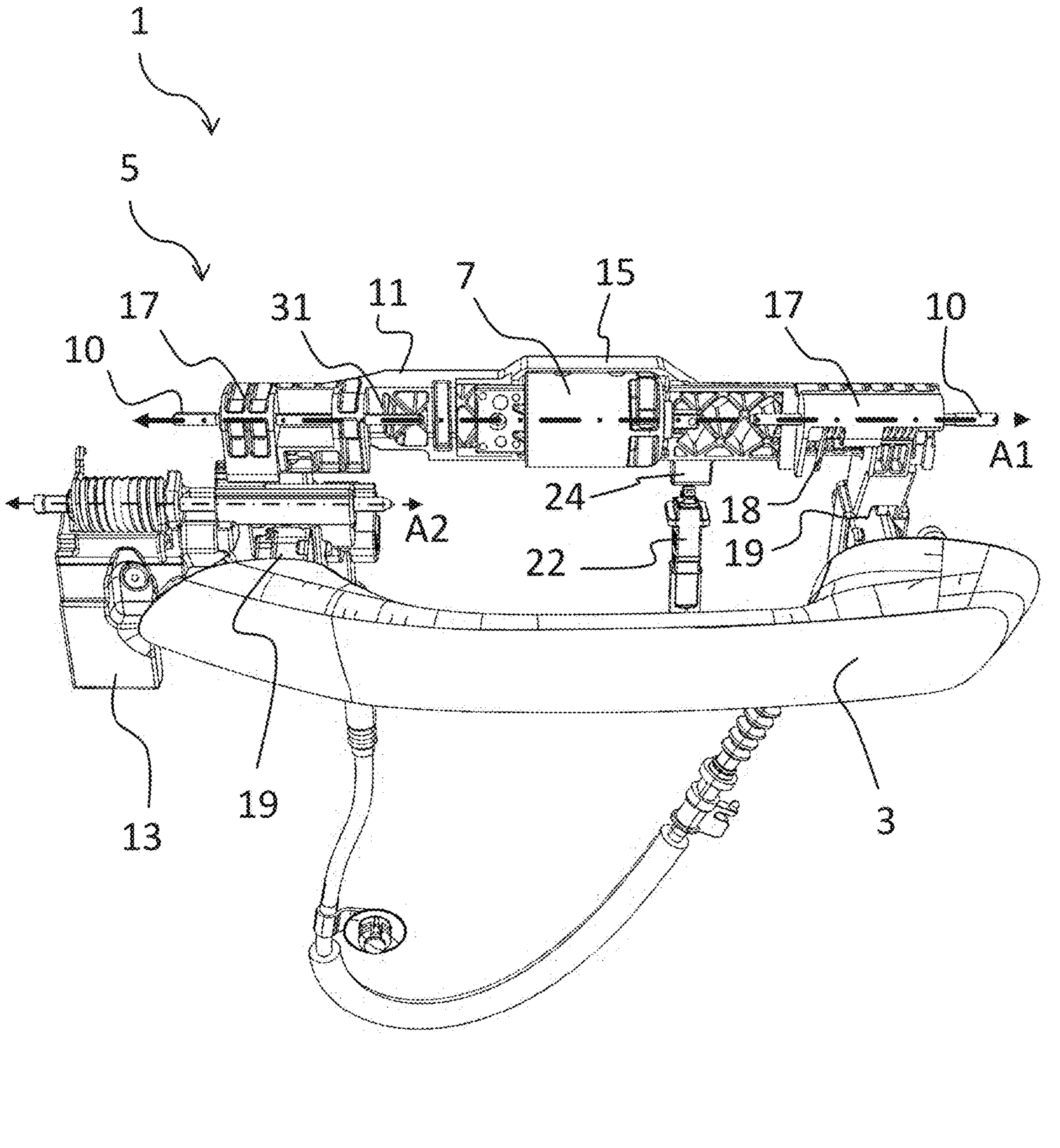
FIG. 1 represents a front view of a handle arrangement according to the invention.

FIG. 4 represents three views (A, B and C) of the declutching system of the handle arrangement of FIG. 1. FIG. 4A is an exploded view of the declutching system. FIG. 4B is a cutting view of the declutching system in a clutch position. FIG. 4C is a cutting view of the declutching system in a declutch position.

FIG. 5 represents three views (A, B and C) of the handle arrangement of FIG. 2 with a handle in a stowed position. FIG. 5A represents a front view of the handle arrangement. FIG. 5B is a back view of FIG. 5A showing the cooperation from that side between a counterweight of a declutching system and a deploying system of the handle arrangement. FIG. 5C is a sectional view of FIG. 5A according to the cutting plan BB showing the cooperation between a declutching system and a deploying system of the handle arrangement.

FIG. 6 represents three views (A, B and C) of the handle arrangement of FIG. 2 with a handle in an intermediate position. FIG. 6A represents a front view of the handle arrangement. FIG. 6B is a back view of FIG. 6A showing the cooperation from that side between a counterweight of a declutching system and a deploying system of the handle arrangement. FIG. 6C is a sectional view of FIG. 6A according to the cutting plan CC showing the cooperation between a declutching system and a deploying system of the handle arrangement.

FIG. 7 represents three views (A, B and C) of the handle arrangement of FIG. 2 with a handle in a deployed position. FIG. 7A represents a front view of the handle arrangement. FIG. 7B is a back view of FIG. 7A showing the cooperation from that side between a counterweight of a declutching system and a deploying system of the handle arrangement. FIG. 7C is a sectional view of FIG. 7A according to the cutting plan DD showing the cooperation between a declutching system and a deploying system of the handle arrangement.

DETAILED DESCRIPTION OF THE INVENTION

The following achievements are examples. Although the specification refers to one or several embodiments, it does not imply that each reference refers to the same embodiment or that the features apply only to a single embodiment. Simple features of different embodiments can also be combined to provide other embodiments. Front, rear, left, right, longitudinal, up, down, interior and exterior are considered relating to the motor vehicle orientations in which the handle arrangement of the invention is intended to be implemented.

The invention relates to a handle arrangement 1 of a motor vehicle. The handle arrangement 1 comprises a handle 3 and a bracket (not represented) in which are implemented a deploying system 5 and a declutching system 7.

Handle 3 is moveable between a stowed position (FIGS. 1, 3 and 5), an intermediate position (FIG. 6) in which handle 3 causes an electrical unlatching of a door of the vehicle via the deploying system 5 and a deployed position (FIG. 7) in which handle 3 causes a mechanical unlatching of the door via the deploying system 5.

When implemented in the motor vehicle, the handle arrangement 1 is disposed of on both sides of a body skin 9 (FIGS. 2, 5, 6 and 7). Facing the inside part of the skin body 9 are disposed of the deploying system 5 and a declutching system 7 (as represented in FIGS. 2, 5B and 5C, 6B and 6C and 7B and 7C) while the handle 3 is facing the outside part of the skin body 9 (as represented in FIGS. 5A, 6A, and 7A).

Figure 2A:
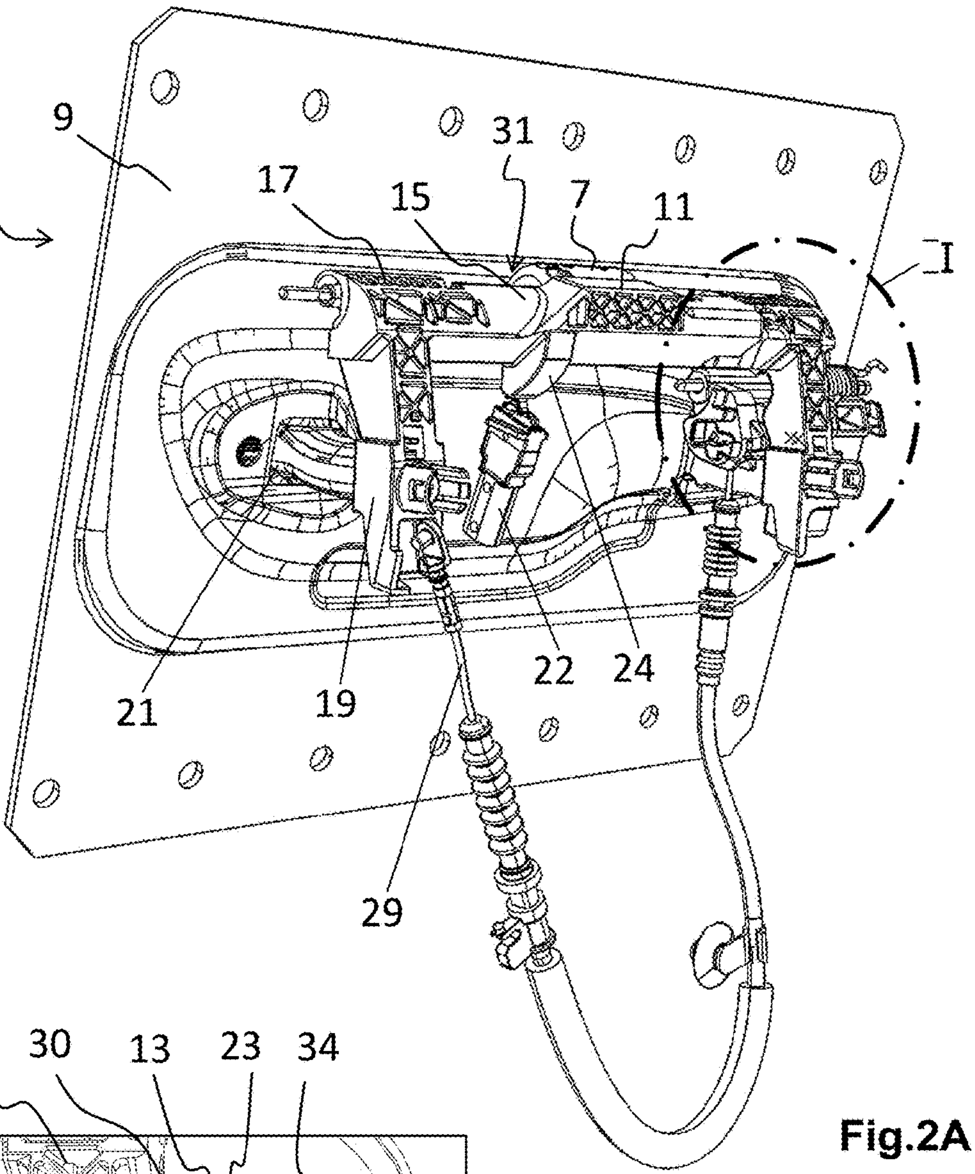
FIG. 2A is a backside view and FIG. 2B is a detailed view of circled part I shown in FIG. 2A representing a counterweight of the handle arrangement.

Looking at FIGS. 1 and 2 together, the deploying system 5 comprises a toggle member 11 which pivots about a primary axis A1 and a counterweight 13 which pivots about a secondary axis A2. The primary and secondary axis A1, A2 are parallels. The toggle member 11 comprises a central body 15, having here an elongated shape, with two opposite ends 17. From each end 17 extends one arm 19. In the represented embodiment, the arms 19 are L-shaped. The arms 19 connect the toggle member 11 to the handle 3 and are each fixed to one end of the handle 3. To that end, each arm 19 passes through a respective opening 21 arranged in the body skin 9, as represented in FIG. 2A.

The toggle member 11 may pivots about the primary axis Z1 by means of two axles each one being arranged at each end 17 of the central body 15, as represented. Alternatively, each axle 10 may be arranged at the upper end of each arm 19.

The positions of the handle 3 and of toggle member 11 are correlated. Hence, the toggle member 11 presents a stowed position, an intermediate position and a deployed position. The toggle member 11 is maintained in the stowed position by means of a reversibly deformable member 18. The reversibly deformable member 18 is notably arranged at one end 17 of the central body 15, especially away from the counterweight 13. The reversibly deformable 18 member may be a spring, like a helicoidal spring, arranged around one of the axles 10. In the intermediate position, the toggle member 11 activates the electrical unlatching of the door, notably by activating an electric door unlatch actuator 22. To that end, the central body may comprise an activating member 24.

Figure 2B:
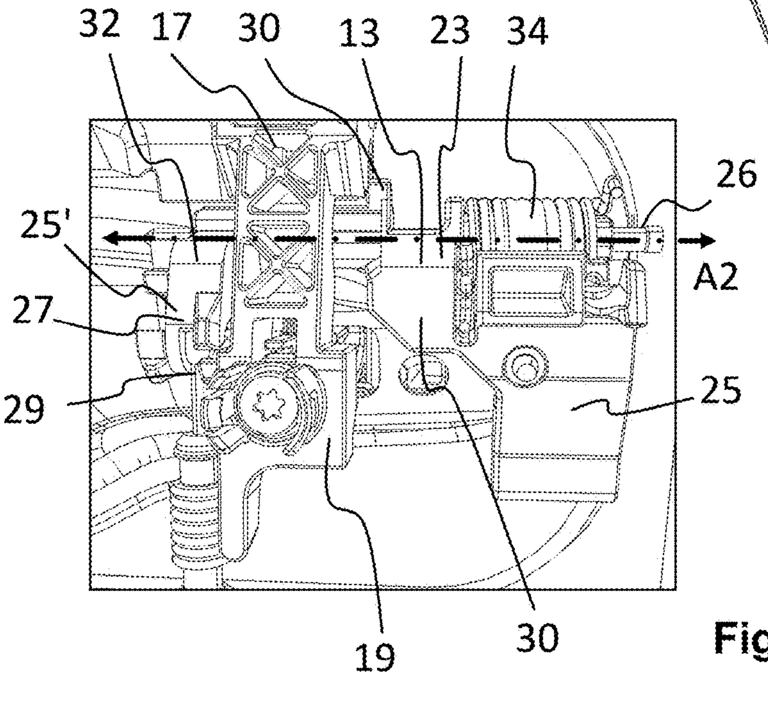

The toggle member 11 and the counterweight may be arranged in a manner that that when the handle 3 moves from one position to another, the toggle member 11 rotationally drives the counterweight about the second axis. The toggle member 11 and the counterweight 13 pivot in a reverse direction about their respective axis (A1, A2). In particular, the counterweight cooperates with one end 17 of the central body 15 of the toggle member 11, as represented in FIG. 2B, or an upper part of one arm 19. To that end, the toggle member 11 and the counterweight may comprise an engagement member 28 and a counter-engagement member 30 respectively (FIGS. 5B, 6B and 7B). The cooperation between the toggle member 11 and the counterweight 13 can be carried out by means of a rib 30 and a groove 28 arranged alongside the secondary axis A2. Especially, the rib 30 is arranged on the counterweight 13 and the groove 28 on the toggle member 11. The cooperation between the toggle member 11 and the counterweight 13 through the different positions of the handle 3 will be described in more detailed below.

The counterweight 13 may comprise a core member 23 disposed along the secondary axis A2 and having an axis 26 therethrough about which it pivots. The rib 30 is notably arranged on the core member 23. The counterweight 13 may comprise two joined parts successively disposed along the secondary axis, wherein a first part is disposed between the two arms 19 of the toggle member 11 and a second part disposed outside the toggle member 11. Accordingly, when the handle 3 moves from the intermediate position to the deployed position, the said arm 19 moves between the said two parts 30, 32.

From the core member 23 may extend at least one weight 25 downwardly. In particular, the counterweight 13 comprises two weights 25 and 25', each one being arranged on opposite sides of said arm 19 of the toggle member 11, especially on the first 30 and second side 32 of the counterweight 13 respectively. Notably, one of the weights 25 is heavier and is positioned on the first part 30. Alternatively, the said heavier weights may be positioned on the second part 32.

The counterweight 13 may comprise a rest position, an intermediate position and an unlatch position in which it mechanically unlatches the door. The rest position corresponds to the stowed position of the toggle member 11, the intermediate position corresponds to the intermediate position of the toggle member, and the unlatch position corresponds to the deployed position of the toggle member 11. The counterweight 13 is maintained in the stowed position by means of a reversibly deformable member 34, especially bearing on a lower part of the core member 23. The reversibly deformable member 34 may be a spring, like a helicoidal spring, wound around the core member 23.

To mechanically unlatches the door, the counterweight 13 may comprise a cable puller 27 for unlatching the door latch. When pivoting to the unlatch position, the cable puller 27 pulls on a cable 29 and unlatch the door. As represented, the cable puller 27 may be arranged on the second part 32. Alternatively, the cable puller 27 may be arranged on first part 30.

The declutching system 7 is arranged vis-à-vis the central body 15 of the toggle member 11, along the primary axis A1. As represented, the declutching system 7 may be arranged in a cavity 31 of the central body 15 (better view in FIG. 3A). Accordingly, the declutching system 7 may be arranged between the two ends 17 of the central body 15. Hence in that context, the declutching system 7 is surrounded by the central body 15 at least around the primary axis A1.

Turning to FIG. 3, the cooperation between the declutching system 7 and the toggle member 11 will be described.

The purpose of the declutching member 7 is to block the rotation of the toggle member 11 about the primary axis A1 at the intermediate position in case the user pulls on handle 3 with a load force beneath a predetermined force threshold. To that end, the declutching system 7 and the central body 15 may respectively comprise a cooperating member 33, as represented in FIG. 3B. In the represented embodiment, the cooperation between the declutching system 7 and the central body 15 is carried out by means of a rib 33 and a groove 35 disposed alongside the primary axis A1. The rib 33 is here arranged on the declutching system 7 and the groove 35 on the central body, especially on the cavity 31, but the reverse is also possible. The cooperation between the declutching system 7 and the central body 15 through the different positions of the handle 3 will be described in detail below.

Turning to FIG. 4, an embodiment of the declutching system 7 is represented. The declutching system 7 may comprise a housing 37, a declutching member 39, an axle 41 and a reversibly deformable member 43. The housing, the declutching member 39 and the reversibly deformable member 43 are arranged on the axle 41 which is disposed alongside the primary axis A1. This axle 41 is arranged in a fixed manner in the bracket and cannot rotate or translate. For that purpose, both ends of the axle 41 may have a rectangular shape, as represented. The declutching member 39, the reversibly deformable member 43 and the middle part of the axle 41 are arranged within the housing 37. The cooperating member 33 may be arranged on the housing 37. The declutching member 39 is configured to achieve a translational movement on the axle 41. Especially, the declutching member 39 is maintained in direction of or against a cam 45 of the housing by the reversibly deformable member 43, the latter being in particular a coil spring.

Especially, as presented, the at least one cam 45 of the housing 37 and the declutching member 39 are spaced apart by a gap 36 sized for allowing the housing 37 to freely pivot about the primary axis A1 and the toggle member 11 to move from the stowed position to the intermediate position. In the intermediate position, the at least one cam 45 of the housing 37 and the declutching member 39 are put in contact. This contact gives the haptic return to the user indicating the electrical unlatch of the door.

The rotation of the housing 5 around the axle 3 is blocked or allowed by the declutching member 39. Accordingly, when a torque force applied on the housing by the central body 15 is beneath the reversibly deformable member 43 strength, the housing cannot displace the declutching member 39 along the axle 43 and is prevented from rotating or rotating beyond contacting the declutching member. Consequently, the toggle member 11 is blocked in the intermediate position. When a torque of magnitude above a particular threshold is applied by the housing 5 on the declutching member 7, the declutching system 1 moves from a clutch position (FIG. 3B) toward a declutch position (FIG. 3C) by a rotational movement of the housing 5 about axle 41 and primary axis A1, and a translational movement of the declutching member 39 compressing the reversibly deformable member 43. Accordingly, the toggle member 11 continues its rotational course and move to the deployed position.

The deploying and blocking mechanisms cinematic of the handle arrangement 1 will now be described in view of FIGS. 5 to 7.

FIG. 5A represents the handle 3 in the stowed position. In that position, the two ends of the handle 3 are maintained in contact with the front face of the skin body 9 by the toggle member 11.

In the other side of the skin body 9, the toggle member 11 is in the stowed position, the counterweight 13 is in the rest position and the declutching system 7 is in the clutch position.

FIG. 5B shows in detail the position of the counterweight 13 and the toggle member 11 in that position and their cooperation. Here, the toggle member 11 is pulled in direction of the backside of the handle arrangement 1 by its reversibly deformable member 18. Especially, in that position, the toggle member 11 is maintained in contact with the bracket by the reversibly deformable member 18. In parallel, arms 19 may be in contact with the lower side of openings 21 of the body skin 9. By contrast, the counterweight 13 is pulled in direction of front side of the handle arrangement 1 by its reversibly deformable member 34. As represented, the toggle member 11 and the counterweight 13 may be in contact in that position, especially by means of the engagement and counter-engagement members 28, 30. Consequently, as soon as the handle 3 is pulled by the user, the counterweight 13 is driven into rotation by the toggle member 11.

FIG. 5C shows in detail the relative position of the toggle member 11 and the declutching system 7 and their cooperation. In the represented embodiment, the cooperation members 33, 35 of the central body and the declutching system 7 are in contact. The electric door unlatch actuator 22 and the activating member 24 are spaced apart.

FIG. 6A represents the handle 3 in the intermediate position. To reach that position, the user pulled up the handle 3. In that position, the two ends of the handle 3 are spaced apart from the front face of the skin body 9.

FIG. 6B shows in detail the position of the counterweight 13 and the toggle member 11 in that position and their cooperation. Because the handle has been pulled up, the toggle member 11 pivoted about the primary axis A1 and the arms 19 moved through openings 21. The reversibly deformable member 18 is compressed. As a consequence of the movement of the toggle member 11, the engagement member 28 pushed on the counter-engagement member 30 of the counterweight 13, driving the latter in rotation around the secondary axis A2 and compressing the reversibly deformable member 34. Nevertheless, this movement it too short to trigger the mechanical unlatch of the door via the cable puller 27. Accordingly, both the toggle member 11 and the counterweight 13 are in the intermediate position.

As shown in FIG. 5C, the movement of toggle member 11 about primary axis A1 drives into rotation the housing 37 around axle 41 by means of the cooperation members 33, 35. Then, housing 37 enters in contact with declutching member 39. That contact, when the load force applied by the user on the handle is below the determined threshold, will stop the movement of the housing 37 and then the toggle member 11, giving the user a haptic return it reached the activated the electric door unlatch. Indeed, in the meantime and as represented in this figure, the activating member 24 engaged and pushed on a reversibly deformable upper part 47 of the electric door unlatch actuator 22, triggering the electric door unlatch.

In case the user stops pulling up the handle, the latter return to the stowed position by means of the action of the different reversibly deformable member 18, 34 and 43, and the counterweight 13 being attracted by gravity force.

In case the door did not electrically unlatch, the user has the possibility to pull harder on the handle, moving the latter to the deployed position shown in FIG. 6A. In that position, the arms 19 may be in contact with the upper side of the opening 21, stopping the movement of the handle 3.

FIG. 6B shows in detail the position of the counterweight 13 and the toggle member 11 in that position and their cooperation. Driven by the movement of the handle 3, the toggle member 11 continues its stroke around primary axis A1 and consequently continues to drive counterweight 13 into rotation about secondary axis A2. The movement of the counterweight 13 may be stopped via a resilient bearing 49 contacting the bracket. In the meantime, the cable puller 27 of the counterweight pulled in cable 29 and triggers the mechanical unlatch of the door.

As represented in FIG. 6C, because the load force exerted by the user is here higher than the predetermined threshold, the declutching system 7 is declutched and the housing 37 continues to pivot about the primary axis A1. Besides, the activating member 24 and the electric door unlatch actuator 22 are configured to let the activating member 24 continue its stroke about the primary axis A1.

Finally, when the user stopped pulling up the handle, the latter returns to the stowed position by means of the action of the different reversibly deformable member 18, 34 and 43, and the counterweight 13 moving back by means of the gravity force attraction.

The invention claimed is:

1. A handle arrangement comprising a handle moveable between a stowed position, an intermediate position in which the handle causes an electrical unlatching of a door and a deployed position in which the handle causes a mechanical unlatching of the door, a deploying system of the handle pivotally coupled with the handle and comprising a counterweight being rotatably mounted in the handle arrangement, a declutching system being rotatably mounted in the handle arrangement on a primary axis A1, the declutching system cooperating with the deploying system and having a clutch position, in which it impairs with the deploying system movement to prevent the handle to move from the intermediate position to the deployed position in case a load force beneath a predetermined force threshold is applied on the handle, and a declutch position wherein the declutching system allows the handle to move from the intermediate position to the deployed position in case a load force above a predetermined force threshold is applied on the handle, wherein the counterweight pivots about a secondary axis A2 parallel to the primary axis A1 and is configured to trigger the mechanical unlatch of the door when the handle is in the deployed position, wherein the deploying system comprises a toggle member comprising a central body with two opposite ends to which extend one arm respectively, each arm being connected to one extremity of the handle and the toggle member being pivotally mounted in the handle arrangement about the primary axis A1 and driving into rotation the counterweight, wherein the declutching system cooperates with the central body of the deploying system and both pivot about the primary axis A1 in the same direction, wherein the declutching system, the counterweight and the toggle member pivot about respective axles and wherein the central body of the toggle member comprises a cavity in which the declutching system is arranged, the declutching system being surrounded by the central body, wherein the declutching system comprises a housing arranged on the axle of the declutching system and pivoting about the primary axis A1, and wherein in the clutch position, when a torque of magnitude applied on the housing is beneath the determined force threshold, the housing is blocked from rotation around the declutching system axle, and in the declutch position, when a torque of magnitude applied on the housing is above the determined force threshold, the housing is free to rotate around the axle.

2. The handle arrangement according to claim 1, the central body of the toggle member extends parallelly to the longitudinal direction of the handle.

3. The handle arrangement according to claim 1, wherein the cavity has a complementary form of at least a part of the declutching system.

4. The handle arrangement according to claim 1, wherein the declutching system and the central body cooperates by means of a rib and a groove arranged alongside the primary axis A1.

5. The handle arrangement according to claim 1, wherein the declutching system is located at an equal distance from each end of the central body of the toggle member.

6. The handle arrangement according to claim 1, wherein the declutching system is arranged on a front side of the handle arrangement relative to the central body of the toggle member.

7. The handle arrangement according to claim 1, wherein the counterweight has a rest position, an intermediate position and an unlatch position in which it mechanically unlatches the door.

8. The handle arrangement according to claim 1, wherein the toggle member and the counterweight pivot in opposite directions about their respective axis.

9. The handle arrangement according to claim 1, wherein the counterweight comprises a core member from which one weight extends downwardly.

10. The handle arrangement according to claim 9, wherein the counterweight comprises two weights, each being arranged on opposite sides of one arm of the toggle member, such that when the handle moves from the intermediate position to the deployed position, the said arm moves between the said two weights.

11. The handle arrangement according to claim 1, wherein the counterweight comprises two parts successively disposed along the secondary axis A2, wherein a first part is disposed between the two arms of the toggle member and a second part disposed outside the toggle member.

* * * * *